Aug. 20, 1946.    M. ZIEGLER ET AL    2,406,125
FREQUENCY STABILIZING SYSTEM
Filed Dec. 17, 1943    3 Sheets-Sheet 1

MARC ZIEGLER
JUAN FRANCISCO VISSCHER &
LUIS JOSE CAVALLERO, INVENTORS.

BY

ATTORNEY.

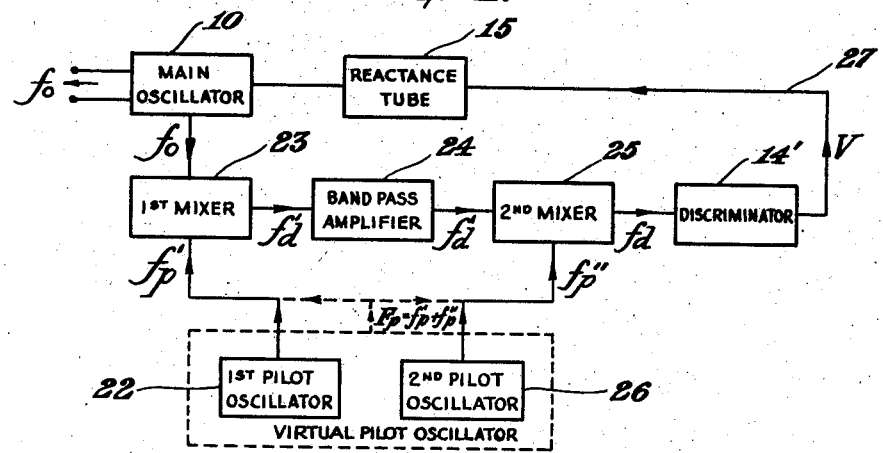
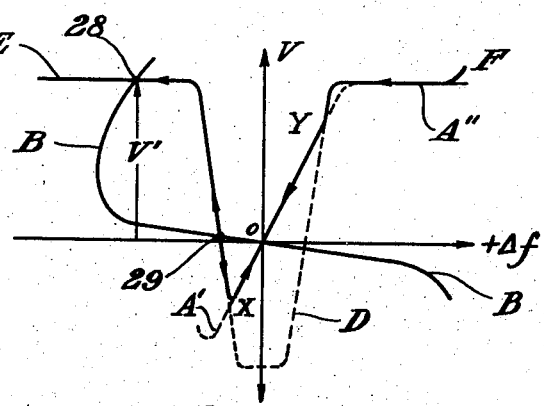
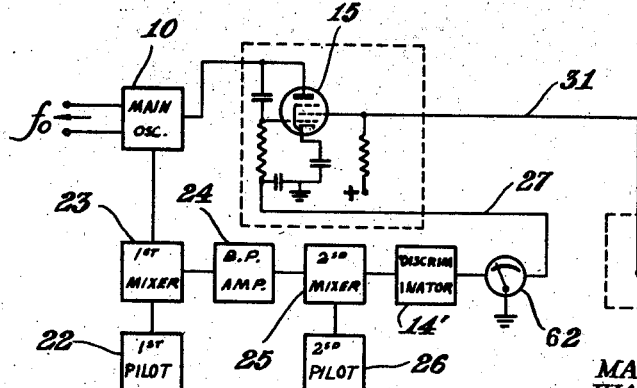
MARC ZIEGLER
JUAN FRANCISCO VISSCHER
& LUIS JOSE CAVALLERO
INVENTORS
BY
ATTORNEY

MARC ZIEGLER
JUAN FRANCISCO VISSCHER
& LUIS JOSE CAVALLERO
INVENTORS

BY
ATTORNEY.

Patented Aug. 20, 1946

2,406,125

UNITED STATES PATENT OFFICE 2,406,125

FREQUENCY STABILIZING SYSTEM

Marc Ziegler, Juan Francisco Visscher, and Luis Jose Cavallero, Buenos Aires, Argentina, assignors to Hartford National Bank and Trust Company, Hartford, Conn., as trustee Application December 17, 1943, Serial No. 514,710

6 Claims. (Cl. 250—36)

This invention relates to frequency stabilizing systems and more particularly to improvements in frequency stabilizing systems of the type wherein an adjustable main oscillation is maintained at some nominal frequency by means of an electrical control quantity derived from the frequency difference between the main and a pilot oscillation.

Generally, both oscillations are subtractively mixed in a thermionic mixer or converter tube, the resulting difference frequency being applied to a frequency discriminator which develops in its output an electrical control quantity having a substantially zero amplitude for the nominal value of the main oscillation and being proportional in amplitude and sign to the deviations of this main oscillation from its nominal value. By judiciously connecting the output of the frequency discriminator to the frequency adjusting means of the main oscillator, any deviation of the main oscillation from its nominal value is automatically compensated by the generated positive or negative control quantity which, acting on said frequency adjusting means, causes a shift of the main oscillation frequency in an opposite direction until the stabilizing system has returned to a point near the main point of stable equilibrium, for which the discriminator output is practically zero.

However, it is well known that the frequency stabilizing systems referred to contain several secondary points of stable equilibrium, so that sudden changes in the operating conditions or voltages of the system may cause the frequency of the main oscillation to shift from its correct value to a frequency corresponding to one of these secondary stabilizing points. Under such circumstances the normal adjustment of the main oscillation is lost completely, since the correct operation of the frequency stabilizing system is not re-established automatically. Even if the main oscillation has moved to a secondary point of equilibrium, the discriminator output may still be substantially zero, so that there is no direct indication of the misadjustment of the system.

It is therefore one of the main objects of the present invention to provide a frequency stabilizing system wherein the points of stable equilibrium corresponding to the zero amplitude of the discriminator output will be limited to the working point only.

A further object of the present invention is to provide a frequency stabilizing system comprising a discriminator of the compensated counter type which will have only one secondary point of stable equilibrium, this point corresponding to a predetermined magnitude of the control quantity generated by the frequency discriminator.

Yet another object of the present invention is to provide a frequency stabilizing system in which a predetermined change in the operating conditions will facilitate a manual re-adjustment of the system to its correct working point.

Still another object of the present invention is to provide a frequency stabilizing system wherein the discriminator output corresponding to the secondary equilibrium point is utilized for automatically readjusting the main oscillation to the correct working point.

Other features and advantages of the invention will be apparent from a consideration of the following detailed specification taken in connection with the drawings in which:

Fig. 4 is a block diagram illustrating the frequency stabilizing system according to the present invention.

Fig. 5 is a graph showing the relative position of the frequency discrimination and frequency control curves of the stabilizing system illustrated in Fig. 4.

Fig. 6 illustrates a schematic circuit of the frequency stabilizing system according to the present invention including manual readjusting means of the main oscillation.

The same reference characters indicate like or corresponding parts or elements throughout the drawings.

Figure 1:
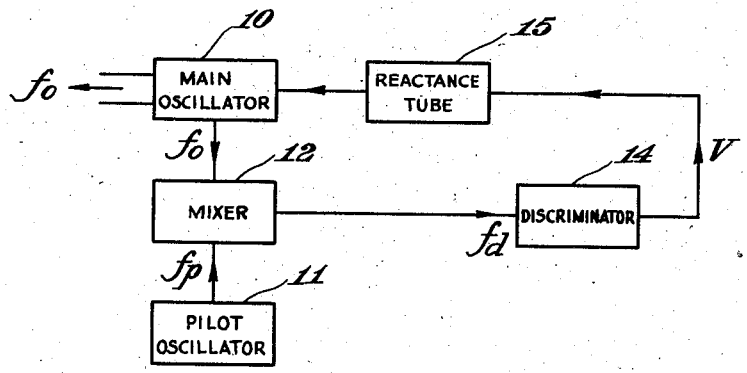
Fig. 1 is a block diagram representing the known frequency stabilizing systems.

Referring now to Fig. 1 of the drawings, it can be seen that in the known frequency stabilizing system of the type referred to the main oscillation $f_o$ generated in main oscillator 10 is mixed with pilot oscillation $f_p$ generated in pilot oscillator 11 in a thermionic mixer tube 12, the resulting difference frequency $f_d = f_o - f_p$ being applied to the input of frequency discriminator 14.

Discriminator 14 is designed to develop between its output terminals connected to reactance tube 15 a control quantity V which is zero for the nominal frequency $F_d$ of said difference frequency and which is proportional in amplitude and sign to the deviations of this difference frequency $f_d$ from its nominal value, so that main oscillation $f_o$ will be stabilized on its correct value by means of reactance tube 15 responsive to said control quantity V.

Figure 2:
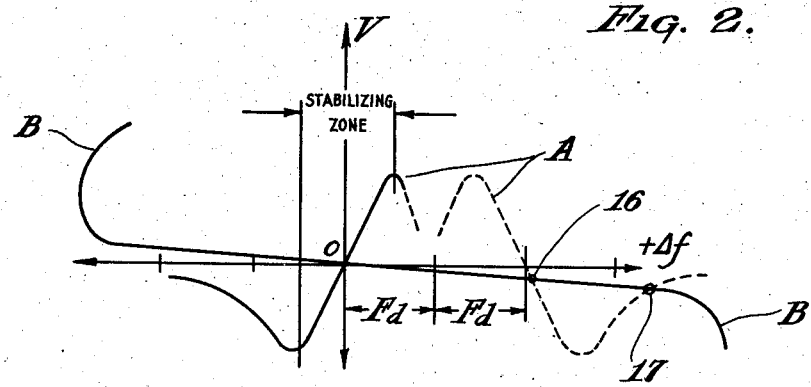
Fig. 2 is a graph showing the discriminator and frequency control curves of the frequency stabilizing system illustrated in Fig. 1 and utilizing a discriminator including selective circuits.

The working points of frequency stabilizing systems are formed at the intersection of the frequency discrimination and frequency control curves for which an increase in the control potential V causes a decrease of the main oscillator frequency $f_o$ and viceversa. However, as can be observed in the graph shown in Fig. 2, discrimination curve A corresponding to a discriminator 14 including selective circuits intersects frequency control curve B at points 0, 16 and 17, of which 0 and 17 are points of stable equilibrium. Consequently, a disturbance causing main oscillation $f_o$ to deviate excessively from its nominal value will probably cause main oscillation $f_o$ to shift to a frequency corresponding to secondary equilibrium point 17 and the correct adjustment of the stabilizing system will be lost completely. The multiple crossing points of the frequency stabilizing systems including tuned circuit discriminators are due to the image response of the frequency mixing means used, discrimination curve A being therefore symmetrical with respect to a vertical axis separated by the nominal difference frequency $F_d$ from the main working point 0 of the system.

Figure 3:
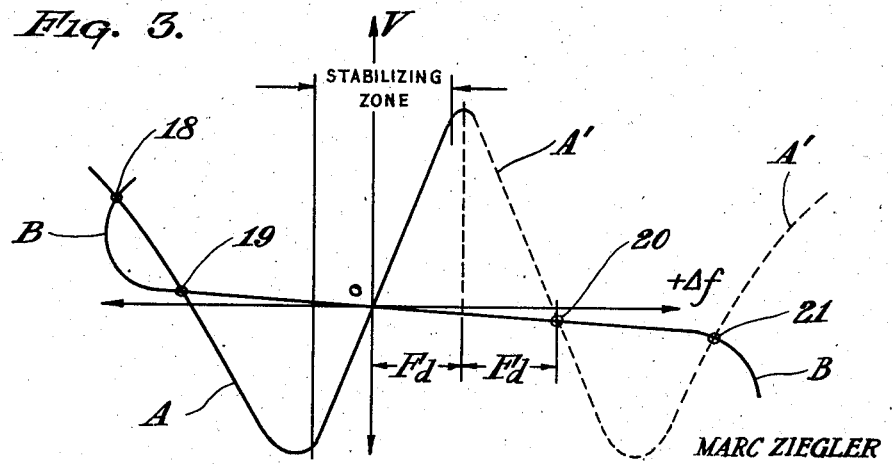
Fig. 3 is a similar graph for the frequency stabilizing system according to Fig. 1, but in which a compensated frequency counter is used for discriminating purposes.

For similar reasons, frequency discrimination curve A' of a discriminator 14 based on a compensated frequency counter would intersect the frequency control curve B at a plurality of points 18, 19, 0, 20 and 21. As can be seen in the graph shown in Fig. 3, points 18, 0 and 21 constitute points of stable equilibrium, while 19 and 20 are points of unstable equilibrium.

It will be evident for those skilled in the art that the presence of several points of stable equilibrium constitute one of the most serious drawbacks of the frequency stabilizing systems shown in Fig. 1. A further disadvantage of these frequency stabilizing systems consists in that control quantity V corresponding to points 17 and 21, respectively, is approximately equal to control quantity V corresponding to main working point 0, which makes it practically impossible to discriminate between the correct and incorrect adjustment of the system.

In prior United States patent application Serial No. 488,582 of Marc Ziegler, filed May 26, 1943, one solution for overcoming this drawback in frequency stabilizing systems containing discriminators of the compensated frequency counter type has been indicated. It has been pointed out in the above mentioned application that the number of points of stable equilibrium can be reduced to one only by conveniently limiting the discriminator output. However, it has been found in practice that in some applications of the frequency stabilizing systems the discriminator output must be kept within somewhat close limits, this condition complicating the design of the limiter stage required.

We have now found that by subtractively mixing the controlled main oscillation successively with a first and a second pilot oscillation, the sum of the nominal frequencies of which is equal to the nominal frequency of a virtual pilot oscillation from which the main oscillation differs by a predetermined nominal value, and by amplifying the difference frequency signal obtained in the output circuit of the first mixer stage in a selective amplifier of predetermined band width, a frequency stabilizing system is obtained having only one point of stable equilibrium corresponding to a zero magnitude of the control quantity utilized for stabilizing the main oscillation at the desired value.

When using discriminators of the compensated frequency counter type in the frequency stabilizing system according to the present invention, a secondary point of equilibrium is obtained for which the discriminator output is equal to the compensating tension. Hence, in the frequency stabilizing system, according to the present invention, the working frequency is the only one for which there is a stable adjustment of zero output and a shift of the main oscillation to a frequency corresponding to the secondary equilibrium point is immediately detected by the change in the amplitude of the discriminator output. Consequently, this change can be used for automatically or manually readjusting main oscillation $f_o$ to its nominal value, as will be explained hereinafter.

Referring now to Fig. 4, it can be observed that in the frequency stabilizing system according to the present invention, main oscillator 10 is coupled, together with first pilot oscillator 22 to a first mixer 23 which develops in its output circuit a secondary difference frequency $f'_d$ equal to the difference between main oscillation $f_o$ and first pilot oscillation $f'_p$.

The output circuit of first mixer 23 is coupled to a band pass amplifier 24, the selectively amplified secondary difference frequency $f'_d$ being applied to the input of a second mixer 25 to which a second pilot oscillator 26, generating second pilot oscillation $f''_p$, is also connected.

Second mixer 25 develops in its output circuit a main difference oscillation $f_d = f'_d - f''_p$, while discriminator 14', connected to the output of second mixer stage 25, derives from said main difference frequency $f_d$ an electrical control quantity V which is zero for the nominal value of said difference frequency and which is proportional in amplitude and sign to the deviations $\Delta f$ of this difference frequency from its nominal value $F_d$. As usual, control quantity V is applied by means of main control connection 27 to reactance tube 15 coupled to main oscillator 10.

It will be evident to those skilled in the art, that in the frequency stabilizing system according to the present invention, main oscillation $f_o$ will be stabilized on some nominal frequency differing by a main nominal difference frequency $F_d$ from a virtual pilot oscillation $F_p$ equal to the sum pilot oscillation $f'_p$ and $f''_p$, since as long as the condition $F_d = F_p - f_o$ is fulfilled, main oscillation $f_o$ will be maintained on its correct value.

Band pass amplifier 24 is designed to have a band width not exceeding twice the nominal main difference frequency $F_d$, so that frequency discrimination curve A'' of the frequency stabilizing system, according to the present invention, represents a combination of discrimination curves A or A' with curve D representing the band pass characteristics of amplifier 24. In the graph shown in Fig. 5, discrimination curve A'' is drawn for a discriminator 14' of the compensated frequency counter type, similar to that described in prior United States application Ser. No. 477,900 of Marc Ziegler, filed March 4, 1943, curve A'' thus being constituted by straight portions X—O—Y corresponding to discrimination curve A' (see Fig. 3) of 14' and portions E—X and F—Y of said band pass curve D.

Due to the selectivity characteristics of band pass amplifier 24 in the frequency stabilizing system according to the present invention and shown in Fig. 4, intersection point 0 of discrimination and frequency control curves A'' and B, respectively, constitutes the only point of stable equilibrium for which the output of frequency discriminator 14' is substantially zero, since control quantity V' corresponding to secondary equilibrium point 28 has a magnitude which is considerably different from zero and which is equal to the compensating voltage, if a compensated frequency counter were used for discrimination purposes. Intersection point 29 of curves A'' and B is a point of unstable equilibrium.

Hence, if in a frequency stabilizing system according to the present invention comprising a compensated frequency counter discriminator, the frequency of main oscillation $f_o$ shifts to a frequency corresponding to secondary equilibrium point 28 as a result of some disturbance in the normal operating conditions of the system, the change in the operating conditions can be easily detected by the corresponding change in the control quantity V, and main oscillation $f_o$ can be readjusted to its nominal frequency either manually or automatically, as will be explained hereinafter.

Fig. 6 illustrates the application of manual readjusting means to the frequency stabilizing system, according to the present invention. As can be seen in the drawings, main control connection 27, coupling the output of discriminator 14' with the control grid of reactance tube 15 in a well known way, passes through an electrical measuring instrument 62 responsive to control quantity V, the position of the instrument pointer thus constituting a univocal indication of the operating conditions of the system. If main oscillation $f_o$ shifts to secondary equilibrium point 28, it can be readjusted to its correct nominal value by momentarily pressing down button 30 which connects the screen grid of reactance tube 15 to the ground potential through auxiliary control connection 31. The consequent change in the operating conditions of reactance tube 15 causes the frequency $f_o$ of the main oscillation to increase to some value for which the corresponding difference frequency $f_d$ momentarily falls within the falling-back zone of the stabilizing system. This falling-back zone extends to the right of point 29 of unstable equilibrium over straight portion X—O—Y and part of portion Y—F of discrimination curve A''. As indicated by the arrows in the graph shown in Fig. 5, once difference frequency $f_d$ has reached a value corresponding to this falling-back zone, main oscillation $f_o$ will be stabilized or brought back automatically to its correct value due to the stabilizing characteristics of the system.

Figure 7:
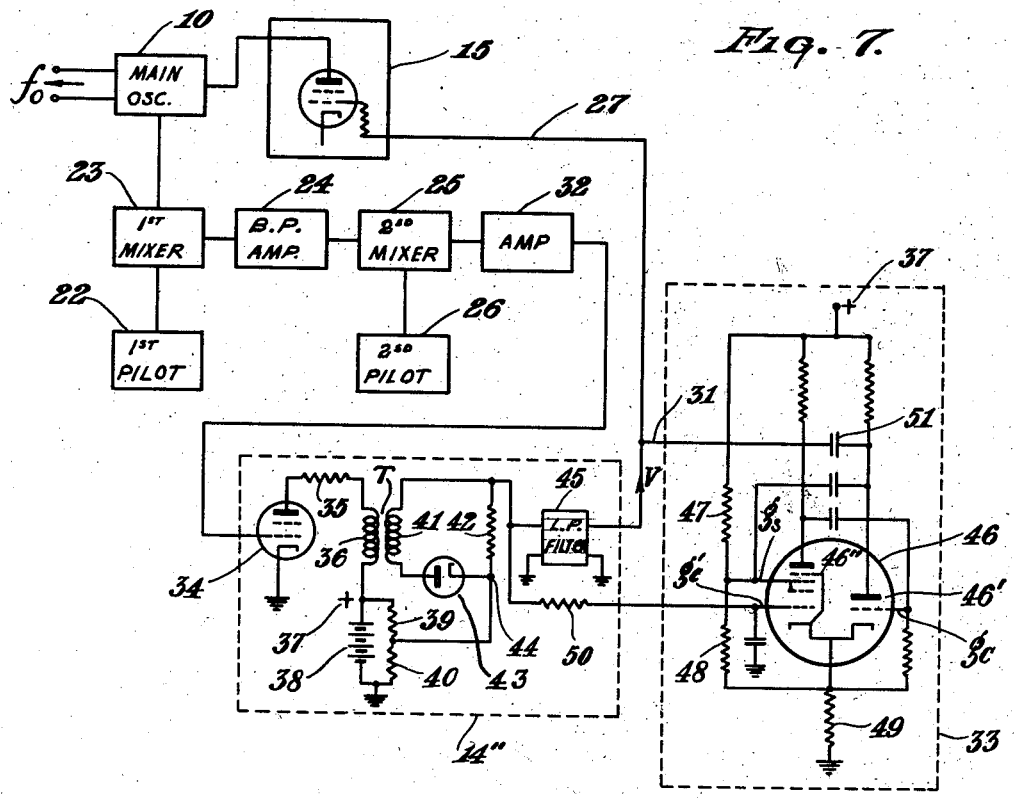
Fig. 7 illustrates a modification differing from that of Fig. 6 in that the readjustment of the main oscillator is carried out automatically, and finally Fig. 8 exemplifies another embodiment of the frequency stabilizing system according to the present invention provided with automatic readjusting means.

The arrangement of Fig. 7 differs from the previous embodiment of the invention, in that an aperiodic amplifier 32 is inserted between second mixer 25 and the input of discriminator 14'' and that electronic readjusting means 33 are used to automatically readjust main oscillation $f_o$ to its correct frequency. Frequency discriminator 14'' used in this embodiment of the invention is of the compensated inductance counter type, the operation of which has been fully described in the above-mentioned prior United States patent application Serial No. 477,990 and is constituted by a counting tube 34 having its control grid coupled to the output of aperiodic amplifier 32, while the plate circuit of this tube is formed by a current limiting resistance 35 and primary winding 36 of a transformer T. Winding 36 is connected with one of its ends to the positive pole 37 of a direct current supply 38 shunted by resistances 39 and 40 connected in series to form a potentiometer.

The plate current of counting tube 34 is closed in synchronism with the positive half waves of main difference frequency $f_d$ and the voltage pulsations developed across primary winding 36 are transformed in impulses of like sign and constant area in the rectifier circuit constituted by secondary winding 41 of transformer T, load resistance 42 and diode 43. Junction point 44 between one end of load resistance 42 and the cathode of diode 43 is connected to the junction point between resistances 39 and 40, while the other end of load resistance 42 is coupled to a low pass filter 45 for integrating the impulses appearing across said load resistance 42. Control voltage V developed in the output of discriminator 14'' will therefore be zero for the nominal value $F_d$ of main difference frequency $f_d$ independently of variations in current supply 38 and will be proportional to the deviations of $f_d$ from its nominal frequency as has been explained in detail in the above mentioned patent application.

Load resistance 42 is connected with its end coupled with low pass filter 45 to the input of electronic adjusting means 33 constituted by a pentode-triode tube 46, control grid $g_c$ of triode section 46' and screen grid $g_s$ of pentode section 46'' being connected to the anodes of the pentode and triode sections, respectively, to form the well known circuit of a relaxation oscillator. Resistances 47 and 48 constitute a potentiometer for supplying screen grid $g_s$ of pentode section 46'' with a convenient operating potential, resistance 48 being connected between the screen grid and cathode resistance 49 of tube 46. Resistances 47, 48 and 49 constitute a semi-automatic bias arrangement for pentode section 46'' of tube 46, the biasing potential of the pentode grid $g'_c$ being of such a magnitude to render inoperative the relaxation oscillator formed by both sections of tube 46.

Under normal operating conditions of the frequency stabilizing system the relaxation oscillator is maintained inoperative since the voltage developed across load resistance 42 is approximately zero as long as main oscillation $f_o$ is maintained on its nominal value.

However, as soon as the working point of the frequency stabilizing system shifts to secondary equilibrium point 28, a relatively high positive voltage, substantially equal to the compensating voltage of frequency counter 14'' is developed across load resistance 42, and this positive potential applied to control grid $g'_c$ of pentode section 46'' through coupling resistance 50 compensates the negative bias existing on said grid, so that the relaxation oscillation is started.

The voltage impulses generated at the anode of triode section 46' are applied by means of coupling condenser 51 and auxiliary control connection 31 to the control grid of reactance tube 15 which shifts the frequency of main oscillation $f_o$ for each impulse to a value corresponding to the falling-back zone of the system. The correct operating conditions of main oscillator 10 are thus re-established almost instantaneously and automatically, and, if the phenomenon causing the disturbance in the operation of the system has disappeared, the frequency stabilizing system will remain on its correct working point.

Figure 8:
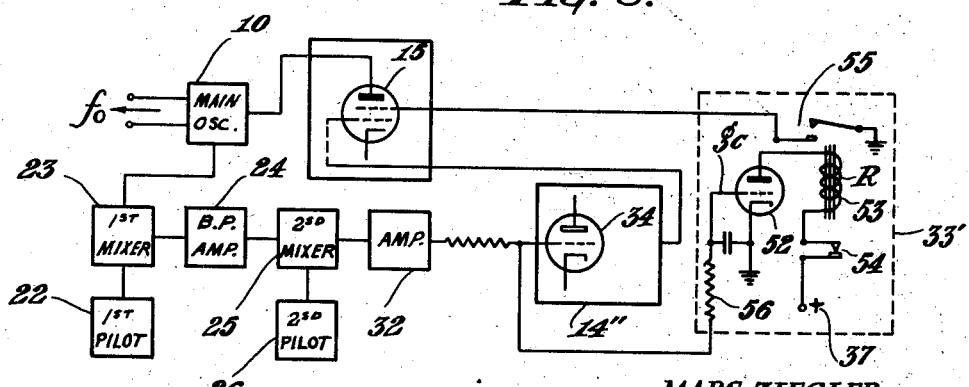

The circuit shown in Fig. 8 differs from that of Fig. 7 in that the controlling potential for the automatic readjusting means 33' is derived by the rectification of difference frequency $f_d$, the control grid of counter tube 34 being used for this purpose in a grid-rectifier circuit. A further difference is the utilization of a relay R connected with a triode 52 in the form of an electromechanical vibrator arrangement. Coil 53 of relay R is connected with one end to the plate of triode 52, while the other end of the coil is connected to the positive pole 37 of a suitable voltage supply through break contacts 54. Relay R is further provided with a set of make contacts 55 having one of its contact arms connected to ground potential while the other is directly coupled with the screen grid of reactance tube 15 in a way similar to that shown in Fig. 6.

Control grid $g_c$ of triode 52 is connected through resistance 56 to the control grid of counter tube 34 and the high negative voltage resulting from the rectification of the maximum amplitude of main difference frequency $f_d$ renders inoperative automatic readjusting means 33' under normal operating conditions, since the contacts 55 are maintained in the open position due to the de-energization of the relay R by the highly biassed triode 52 acting as an electronic switch.

However, as soon as main oscillation $f_o$ shifts to a frequency corresponding to secondary equilibrium point 28, the amplitude of $f_d$ decreases to a value which is not sufficient to bias triode 52 to cut-off, due to the selectivity characteristics of band pass amplifier 24. Consequently, relay R periodically closes and opens contacts 55, thus shifting the frequency of main oscillation $f_o$ and the frequency stabilizing system is automatically readjusted to the correct working point, as already explained hereinabove.

Owing to the stabilizing characteristics of the system according to the present invention, the frequency of main oscillation $f_o$ will vary within close limits even for a considerable change in the tuning capacity. If, due to an excessive detuning, the correct adjustment of the system is lost, it is not necessary to bring back manually the frequency of the main oscillation to a value corresponding to the falling-back zone, since the automatic readjusting means take care of this operation as soon as the stabilization zone of the system has been reached.

It is to be understood that the invention is not limited to the circuits hereinbefore specifically described for the purpose of illustration, but that variations and modifications may be made without departing from the scope of this invention, as set forth in the appended claims.

We claim:

1. A method of stabilizing an adjustable main oscillation on some nominal frequency differing by a main nominal frequency difference from the nominal frequency of a virtual pilot oscillation, comprising the steps of subtractively mixing said main oscillation successively with a first and a second pilot oscillation to obtain said main frequency difference, the sum of the nominal frequencies of said pilot oscillations being equal to the nominal frequency of said virtual pilot oscillation, transforming said main difference frequency into electrical impulses of like sign and constant amplitude and area, integrating said electrical impulses to obtain an electrical control quantity proportional to the deviations of said main difference frequency from its nominal value, and selectively amplifying the secondary frequency difference obtained between said main and said first pilot oscillation over a predetermined frequency range to obtain a main stabilizing and a secondary equilibrium point corresponding to a substantially zero and a predetermined magnitude, respectively, of said electrical control quantity, and shifting the frequency of said main oscillation to a frequency corresponding to the falling-back zone of the system in response to the predetermined amplitude of the said electrical control quantity, so that the said main oscillation will be stabilized on its frequency corresponding to said main stabilizing point.

2. A method of stabilizing an adjustable main oscillation on some nominal frequency differing by a main nominal frequency difference from the nominal frequency of a virtual pilot oscillation, comprising the steps of subtractively mixing said main oscillation successively with a first and a second pilot oscillation to obtain said main frequency difference, the sum of the nominal frequencies of said pilot oscillations being equal to the nominal frequency of said virtual pilot oscillation, controlling said main oscillation in accordance with an electrical quantity proportional to the deviations of said main difference frequency from its nominal value and selectively amplifying the secondary frequency difference obtained between said main and said first pilot oscillation over a predetermined frequency range to obtain a main stabilizing and a secondary equilibrium point corresponding to a substantially zero and a predetermined magnitude, respectively, of said electrical control quantity, and varying the frequency of said main oscillation to a frequency corresponding to the falling-back zone of the system in response to said predetermined magnitude of said control quantity, whereby said main oscillation will be automatically returned to a frequency corresponding to said main stabilizing point, when said main oscillation shifts to said secondary equilibrium point.

3. A system for stabilizing an adjustable main oscillation on some nominal frequency differing by a main nominal frequency difference from the nominal frequency of a virtual pilot oscillation by controlling said main oscillation in accordance with an electrical control quantity proportional to the deviations of said main difference frequency from its nominal value, which comprises a main oscillator provided with frequency adjusting means, a first and a second pilot oscillation for generating a first and a second pilot oscillation the sum of the nominal frequencies of which being equal to the frequency of said virtual pilot oscillation, a first means for subtractively mixing said main with said first pilot oscillation to obtain a secondary difference frequency, a second means for subtractively mixing said secondary difference frequency with said second pilot oscillation to obtain said main difference frequency, said second mixing means being coupled to means for impulsively interrupting the current in a circuit including a source of direct current, a resistance and an impedance connected in series to obtain electrical impulses in synchronism with the half-waves of like sign of said main difference frequency, the output circuit of said impulse generating means being coupled to said frequency adjusting means and including a low-pass filter for integrating said electrical impulses to obtain said electrical control quantity, said output circuit including a fraction of the voltage of said source connected in opposition to said control quantity which is compensated to zero when said main oscillation takes its nominal value, a band pass amplifier being inserted between said first and said second mixing means for selectively amplifying said secondary difference frequency over a predetermined frequency range to obtain a main stabilizing point corresponding to a substantially zero magnitude of said control quantity and a secondary equilibrium point corresponding to a predetermined magnitude of said control quantity substantially equal to said voltage fraction, said frequency adjusting means being coupled with auxiliary means for periodically varying the frequency of said main oscillation to a value corresponding to the falling-back zone of the system, the said auxiliary means being operatively responsive to said predetermined magnitude whereby said main oscillation will return to a frequency corresponding to said main stabilizing point, when said main oscillation shifts to said secondary equilibrium point.

4. A system of stabilizing an adjustable main oscillation, according to claim 3, wherein the maximum band width of said band pass amplifier is substantially equal to twice said main difference frequency.

5. A system for stabilizing an adjustable main oscillation on some nominal frequency differing by a main nominal frequency difference from the nominal frequency of a virtual pilot oscillation, which comprises a main oscillator provided with frequency adjusting means responsive to an electrical control quantity proportional to the deviations of said main difference frequency from its nominal value, a first and a second pilot oscillator generating a first and a second pilot oscillation the sum of the nominal frequencies of which being equal to the nominal frequency of said virtual pilot oscillation, a first means for subtractively mixing said main with said first pilot oscillation to obtain a secondary difference frequency, a second means for subtractively mixing said secondary difference frequency with said second pilot oscillation to obtain said main difference frequency, said second mixing means being coupled to means for impulsively interrupting the current in a circuit including a source of direct current, a resistance and an impedance connected in series to obtain electrical impulses in synchronism with the half-waves of like sign of said main difference frequency, the output circuit of said impulse generating means being coupled to said frequency adjusting means and including a low pass filter for integrating said electrical impulses to obtain said electrical control quantity, said output circuit including a fraction of the voltage of said source connected in opposition to said control quantity which is compensated to zero when said main oscillation takes its nominal value, a band pass amplifier being inserted between said first and said second mixing means for selectively amplifying said secondary difference frequency over a predetermined frequency range to obtain a main stabilizing point corresponding to a substantially zero magnitude of said control quantity and a secondary equilibrium point corresponding to a predetermined magnitude of said control quantity substantially equal to said voltage fraction, said frequency adjusting means being coupled with auxiliary means for varying the frequency of said main oscillation, the said auxiliary means being constituted by a pentode and a triode tube connected in a relaxation oscillation circuit, the control grid of said pentode tube being directly connected to the input of said low-pass filter, while the plate of the triode tube is coupled to said frequency adjusting means, so that the frequency of said main oscillation will be varied in synchronism with the voltage impulses appearing at said plate of said triode tube to a value corresponding to the falling-back zone of the system, when said relaxation oscillator is rendered operative by said predetermined magnitude of said control quantity.

6. A system of stabilizing an adjustable main oscillation according to claim 5, wherein said auxiliary varying means are constituted by an electromechanical vibrator arrangement formed of a thermionic tube connected with its control grid to the output of said band-pass amplifier, while the plate of said tube is connected to one end of a relay winding, the other end of which is connected to the positive pole of said direct current supply through a pair of normally closed contacts, said relay being provided with a set of normally opened contacts, one of which being connected to the screen grid of the reactance tube constituting the frequency adjusting means of said main oscillation, while the other contact is connected to ground potential, so that the frequency of said main oscillation will be varied in synchronism with the operation of said vibrator arrangement to a value corresponding to the falling-back zone of the system, when said triode tube is rendered conductive in response to a variation of the amplitude of said main difference oscillation.

MARC ZIEGLER.
JUAN F. VISSCHER.
LUIS J. CAVALLERO.